Figure 1:
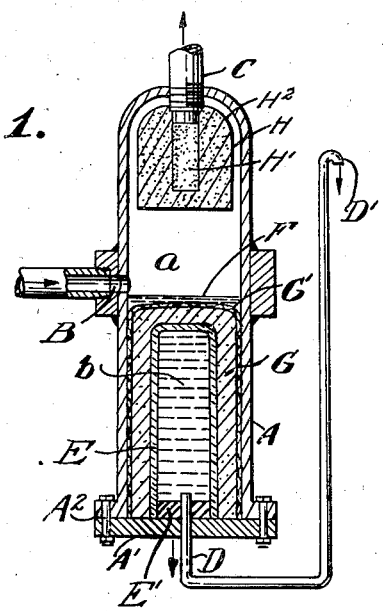

July 30, 1946.  J. M. WALKER, JR  2,404,872
METHOD OF AND APPARATUS FOR SEPARATING IMMISCIBLE FLUIDS
Filed Dec. 29, 1941

INVENTOR
JOHN M. WALKER JR.

BY
John E. Hubbell
ATTORNEY

Patented July 30, 1946

2,404,872

UNITED STATES PATENT OFFICE 2,404,872

METHOD OF AND APPARATUS FOR SEPARATING IMMISCIBLE FLUIDS

John M. Walker, Jr., Philadelphia, Pa., assignor to Selas Corporation of America, a corporation of Pennsylvania Application December 29, 1941, Serial No. 424,800

6 Claims. (Cl. 210—113)

The present invention is concerned with an improvement for separating immiscible fluids.

More particularly, the invention is directed to an improved method and apparatus for separating immiscible fluids.

In accordance with the invention a liquid may be discharged through a set of capillary passages pervious thereto from a chamber or pipe containing such liquid and another fluid immiscible therewith, such other fluid being either a liquid, gas or vapor which may also be discharged through another set of capillary passages pervious thereto. The other fluid in the chamber normally will not pass through the capillary passages through which the liquid is being discharged by reason of a resisting force at the inlets of the capillary passages which is dependent upon the difference in surface tensions of the fluids; and, when the other fluid is also discharged from the chamber through another set of capillary passages, the liquid will not flow through such capillary passages by reason of a resisting force developed at the inlets of the capillary passages which is also dependent upon the difference in surface tensions of the fluids. The fluids in the chamber are subjected to a pressure which will cause flow of the fluid or fluids from the chamber, and, in order to obtain optimum flow of a fluid through a set of capillary passages and still prevent flow of the other immiscible fluid through such passages, the capillary passages are of particular dimensions depending upon each application or use and of a maximum size suitably related to the pressure differential produced across the porous wall member in which the capillary passages are formed.

In many cases I make use of capillary passages formed by the pores of porous solid bodies of various materials including metals, porcelain and other ceramics, rubber, glass, hydraulic cements and carbon. Bodies having suitable capillary passages for various uses of the present invention may also be made by impregnating cloth and other fibrous bodies with various materials. Hydrophobic materials, such as, for example, molybdenum sulphide, magnetic iron oxide, silver and arsenic halides and sulphides, paraffin waxes and various fatty substances, may be used as impregnating materials in thus producing porous bodies or walls which will be preferentially wetted by oily liquids, such as gasoline and kerosene. Hydrophilic materials, which may be used as impregnating materials in the production of bodies which are preferentially wetted by water, for example, include many comminuted metals, ground minerals and clays, and other comminuted materials which are not water repellent and have suitable mechanical properties.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Figure 2:
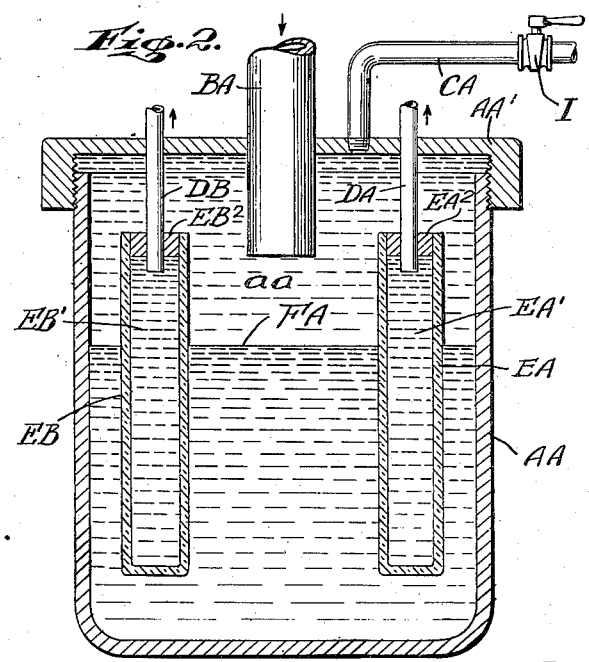

Of the drawing:

Fig. 1 is a sectional elevation of apparatus for separating a liquid from another fluid in contact and immiscible therewith; and Fig. 2 is a sectional elevation of apparatus for separating two immiscible liquids in contact with one another.

The device A shown in Fig. 1 was primarily devised and designed for use in discharging water from air control piping in which the air is supplied under a suitable preselected pressure. As shown, the device A comprises a vertically disposed metallic shell or casing of cylindrical form forming a chamber $a$ and having its lower end closed by a removably secured end member or head A' which is bolt connected to the shell. The shell intermediate its ends is provided with an inlet B. The upper end of the casing is shown as closed, except for a central opening through which extends a vertical air outlet pipe C welded or otherwise secured to the casing to insure a tight joint. The device A is provided with a second outlet pipe D having a lower vertical inlet portion, which extends centrally upward through and makes a tight joint with the lower end member A', and terminates at its upper open end in the hollow interior $b$ of a chambered member E within the chamber $a$ of the device A. The pipe D also includes an uprising external portion having its discharge end D' at a level above the top of the member E in the chamber $a$.

The member E as shown is a thin walled tubular body of porous porcelain having a closed upper end and a lower open end resting on the head A'. As shown in Fig. 1, the member E is axially disposed in the chamber $a$ and has an external diameter appreciably smaller than the diameter of the chamber $a$ and is located below the inlet B, so that the liquid level F in the casing may be above the member E without flooding said inlet. As shown, the annular space between the lower end of the member E and the adjacent portion of the tube D is filled and sealed by an annular body E' of suitable material such as ordinary rubber or cement.

While for practical reasons it is ordinarily advantageous to surround the member E and the inner end of the outlet pipe C with suitable screens, such as those illustrated and hereinafter described, those screens are not necessary to enable the device A to serve its intended purpose of discharging water through the outlet D which is carried into the shell A by compressed air passing into the device A through the inlet B and out through the outlet C.

As will be understood, air cannot pass through the pores of the member E so long as those pores are filled with water. With the discharge end D' of the water outlet pipe D open to the atmosphere at a level a few inches above the top of the member E, the hollow interior b of the member E is kept full of water, at approximately atmospheric pressure, and this prevents the pores from losing their water fillings or plugs as a result of an evaporating or drying action. To prevent water from being blown out of the pores by the compressed air acting against the outer surface of the member E, those pores should each have a minimum diameter or transverse dimension suitably related to the excess of the pressure acting on the outer surface of the member E over the pressure in the chamber b within the member E. The water will not be blown out of the pores or capillary passages in the member E by air so long as In practice, for use under the conditions specified hereinafter, I may form the member E of porcelain in which the maximum pore diameter is about 1.8 microns. With that pore diameter, the rupturing or unblocking pressure of the air acting on the outer surface of the member E required to force the water out of the pores so as to cause passage of air therethrough must exceed the pressure acting on the inner surface of the member by about twenty-five pounds. With a normal working pressure differential of seventeen pounds, a rupturing or unblocking pressure of twenty-five pounds gives a suitably large safety factor.

While the rupturing or unblocking pressure differential is practically independent of the wall thickness of the member E, the water discharge capacity of the member E is inversely proportional to the thickness of the wall. The water discharge capacity is also directly dependent upon the diameter of the pores of the member E, and is also directly proportional to the area of the wall surrounding the hollow interior of the member E. Merely by way of illustration and example, I note that I have found in actual use of apparatus of the character shown in Fig. 1, that with a member E formed to have a substantially uniform pore diameter of about 1.8 microns, an over-all length of four inches, an outside diameter of one inch and a wall thickness of one-sixteenth of an inch, the member E when submerged in water and subjected to a preselected pressure of about seventeen pounds per square inch in excess of the pressure within the member, will pass water at the rate of about six cubic centimeters per minute.

As those skilled in the air control art will understand, the capacity of the device A to discharge water at the rate of six cubic centimeters per minute, is ample to avoid troublesome accumulation of water in the piping of an air control system of the size and capacity ordinarily used in controlling a single furnace or for analogous purposes. As those skilled in the art also will understand, water is continuously carried into an air control system during normal operation by the compressed air supplied thereto. This is so because the temperature of the compressed air discharged into the system by the compressor temporarily increases so that the air can hold more water vapor than when cooler. Consequently as the air becomes cooler and its temperature falls, water of condensation is formed.

Heretofore, the removal of water which condenses out of the air in air control piping has been a troublesome matter. The use of an ordinary float trap of the character largely used in discharging water of condensation from steam lines, when connected to air control system piping, gives rise to pressure surges in the latter which interfere with the control action. The device A is purely static, and its operation gives rise to no pressure surges. As will be apparent, the water discharge capacity of such a device as the device A shown in Fig. 1 may be increased by merely increasing the over-all dimensions of the apparatus including the member E, and may be increased by providing the device with a plurality of water outlet pipes similar to the pipe D, and each associated with a corresponding porous member E.

A device of the general type and form shown in Fig. 1 is adapted for a wide variety of water purging uses. In general, as the differential of the pressures acting on the inner and outer surface of the porous wall through which water is passed increases, the pore diameter must diminish. Thus, I have found that while with porcelain, a pore diameter of about 8.5 microns is sufficient when the pressure differential is from four to five pounds per square inch; the pore diameter should be about 5.5 microns when the pressure differential is about nine to twelve pounds per square inch; and should be about 1.2 microns when the pressure differential is about thirty-five to forty pounds per square inch; and should be about .7 micron when the pressure differential is in the neighborhood of one hundred pounds per square inch.

If the liquid separated from the air in the device A includes a little oil in addition to water, as is usually the case, such oil, if allowed to come freely into contact with the outer surface of the member E will eventually foul or clog the pore passages and thus destroy or materially reduce the effectiveness of the member E. To minimize trouble from this cause and to prolong the life of the device A, I advantageously surround or cover the member E with a suitable porous screen G of material which in practice may well be activated carbon. The latter may be held in place and protected against the displacement action of fluids flowing through the device A by a retaining cloth cover G'.

In air control systems, even minute quantities of dust or the like in the air carried by the air to the bleed orifice or orifices of the system are objectionable. To prevent dust carried into the device A through the inlet B from passing out through its outlet C, I advantageously cover the inner end of the outlet pipe C by a suitable screen H. As shown, that screen is in the form of a block of carbon formed with a central well or cavity H', open at its upper end, and into the upper portion of which the lower end of the pipe C extends and is snugly fitted. The carbon body H is porous and may well have pore diameters of about 85 microns. Advantageously, the outer surface of the body H is lightly wetted with oil preparatory to its use.

While the walls of the pores of carbon do not wet with water, there is some tendency for the air to carry fine entrained globules of water through pores having a diameter as large as 85 microns. This tendency is materially reduced by the light coating of oil on the outer surface of the carbon body. The light oil coating also tends to arrest minute dust particles and entrained minute globules of oil. Minute globules of oil and water impacting against the outer surface of the body H eventually coalesce to form drops heavy enough to break away from the carbon body and fall into the space surrounding the member E. The oil entering that space will be absorbed by the activated carbon and may eventually foul or clog the latter to such an extent as to require its replacement. However, such replacement will ordinarily not be required except after years of regular service.

A device of the character shown in Fig. 1 can also be used to discharge water of condensation from steam power lines, though for such use special provisions may be necessary to prevent the pores of the member E, or of an analogous porous wall, from losing their water fillings as the result of evaporation under the high temperature conditions to which they may be subjected from time to time in the ordinary operation of such a water discharge device. In general, also, such a water discharge device must include a thermostatic air vent or other provisions for discharging the air tending to accumulate in the device. In designing such a device, account should also be taken of the fact that as the temperature increases, the surface tension of the liquid against the steam or vapor diminishes, so that an unblocking pressure suitable for use with a wall having pores of a given diameter at some particular temperature will be unsuitable at a higher temperature.

The apparatus shown in Fig. 1 serves to separate water from oil by discharging water from, and retaining oil in the receiving chamber a. It is possible to use the principles of the present invention in the construction of apparatus in which either of two immiscible liquids, such as oil and water, for example may be discharged from the receiving chamber in which the other is retained, and other apparatus in which both liquids are discharged separately from the receiving chamber. In Fig. 2 is shown one form of apparatus for separating an oily substance, such as gasoline from water, and separately discharging the two liquids from the receiving chamber of the apparatus through capillary passages in different portions of the wall of said chamber, such capillary passages being formed in porous wall members of different materials. The device AA of Fig. 2 forms a cup-shaped receiving or separating chamber aa normally having its upper end closed by a threaded cap member AA'. The chamber aa is adapted to receive a mixture of water and gasoline through an inlet pipe BA which extends downwardly through the cap member AA'. The volumetric capacity of the chamber aa should be large enough, relative to the rate of flow of liquid into the chamber through the inlet pipe BA, to permit the gravitational separation of water and gasoline bodies within the chamber below and above a separation level FA, respectively, which is intermediate the top and bottom of the chamber and rises and falls as the ratio of water to gasoline entering the chamber increases and decreases.

Within the vessel or device AA are disposed two tubular porous bodies EA and EB each having portions above and below the liquid level FA indicating the region of stratification of water and gasoline. One porous body EA is suspended from the lower end of a discharge pipe DA which extends downward through an opening in the cover AA' and passes through an opening in the upper end wall $EA^2$ of the body EA. The other porous body EB is suspended from the lower end of a discharge pipe DB which extends downward through an opening in the cover AA' and passes through an opening in an upper end wall $EB^2$ of the body EB.

The porous body EA may be formed of porcelain and exactly like the hydrophilic body E shown in Fig. 1 and described above. Since porcelain is hydrophilic it is preferentially wetted by water. The porous body EB is hydrophobic and is preferentially wetted by gasoline. The body EB may be formed of carbon or other suitable hydrophobic material which is readily wetted by gasoline.

During normal operation of the device AA the chamber or interior EA' of the porous body EA is kept full of water just as the hollow porcelain element E in Fig. 1, and the chamber or interior EB' of the porous body EB is kept full of gasoline. To prevent objectionable accumulation of air in the upper part of chamber aa, a vent pipe CA may be provided with a normally closed valve I which may be opened from time to time and through which accumulated air may be discharged from the interior of the device AA.

Since the interior of the body EA is kept full of water, the pores or capillary passages thereof will also be filled with water under normal operating conditions, in the same manner that the pores of the hollow element E in Fig. 1 are filled with water. Likewise, since the interior of the body EB is kept full of gasoline, the pores or capillary passages thereof will also be filled with gasoline under normal operating conditions in the same manner that the pores of the body EA are filled with water.

During operation of the device AA of Fig. 2, the mixture of gasoline and water entering the chamber aa through the pipe BA will tend to stratify, and, since water is heavier than gasoline, the water will settle below the liquid level FA and the gasoline above the level FA.

The water below the level FA passes through the pores in the body EA into the interior of the latter. The gasoline above the level FA passes through the pores in the body EB into the interior of the latter. Gasoline cannot pass through the pores of the body EA that are above the liquid level FA, so long as these pores remain filled with water; and water cannot pass through the pores of the body EB that are below the liquid level FA, so long as these pores remain filled with gasoline.

Since the hollow body EA is kept full of water the pores of that body are prevented from losing their water fillings or plugs by evaporation or drying action; and since the hollow body EB is kept full of gasoline the pores in that body are prevented from losing their gasoline fillings or plugs by evaporation or drying action.

The pores of the body EA will remain filled with water and the water in the pores will not be displaced by gasoline so long as the pressure differential across the wall of the body EA does not exceed a predetermined value. Likewise, the pores of the body EB will remain filled with gasoline and the gasoline in the pores will not be displaced by water so long as the pressure differential across the wall of the body EB does not exceed a predetermined value.

Stated another way, the pores of the body EA will remain filled with water up to a predetermined pressure differential established across the wall of that body, and, when this predetermined value is exceeded, the pressure at the outer surface of the body EA will be such that the water filling the pores above the liquid level FA will be displaced by gasoline. Similarly, the pores of the body EB will remain filled with gasoline up to a predetermined pressure differential established across the wall of that body, and, when this predetermined value is exceeded, the pressure at the outer surface of the body EB will be such that the gasoline filling the pores below the liquid level FA will be displaced by water. The pressures at the outer surfaces of the bodies EA and EB at which gasoline passes through the body EA and water passes through the body EB may be referred to as the "unblocking" pressures.

It will now be understood that the porous body EA is permeable to water while the gasoline immiscible therewith is prevented from passing through the pores in that body, so long as the pressure differential across the wall thereof does not exceed a predetermined value. Likewise, it will be evident that the porous body EB is permeable to gasoline while the water immiscible therewith is prevented from passing through the pores in that body, so long as the pressure differential across the wall thereof does not exceed a predetermined value. During normal operation the pressure at the outer surfaces of the bodies EA and EB is below the "unblocking" pressures referred to above, so that the pores of the bodies EA and EB will remain filled with water and gasoline, respectively. Under such normal operating conditions gasoline cannot pass through the water filled pores of the body EA and water cannot pass through the gasoline filled pores of the body EB because of the difference in surface tensions of gasoline and water.

It is especially desirable to cause movement of fluid through each of the porous bodies EA and EB by subjecting the fluid at the outer surfaces of these bodies to a pressure which is just somewhat less than the "unblocking" pressure. Under these conditions an optimum rate of flow of fluid is effected through the porous members EA and EB when the sizes of the pores are suitably related to the pressure differential established across the walls of the members.

This relationship of pore size to pressure differential may be best explained by making it understood that, as the pressure differential across the porous wall increases, it is necessary to employ a wall having pores which are smaller in size. However, for each use it is desirable to employ pores of the greatest possible size for the particular pressure differential to be encountered, so that an optimum rate of flow of the fluid to be separated takes place through the wall. The pore sizes should not be unduly large so that for the particular pressure differential involved, the pressure at one face of the porous wall exceeds the "unblocking" pressure. On the other hand, it is distinctly disadvantageous to employ porous bodies having pores unnecessarily small in size, because the use of such porous bodies slows down the rate of flow of fluid through the bodies more than actually necessary.

For example, the body EA of Fig. 2 may have pores of the different sizes previously stated above for the porous body E of Fig. 1. When the pores of the body EA are about 8.5 microns in diameter, the pressure differential across the wall may reach a definite value without exceeding the "unblocking" pressure and causing the water normally filling the pores to be displaced by the gasoline immiscible therewith. Now, when the pressure differential is increased sufficiently from such definite value so that the "unblocking" pressure is exceeded, pores having a diameter of 8.5 microns would be too large for the increased pressure differential and the pores above the liquid level FA would not be able to hold their water fillings. However, by employing a body having pores of about 5.5 microns in diameter, for example, it may be possible to obtain an optimum rate of flow of fluid therethrough without exceeding the "unblocking" pressure that exists for such a wall for the increased pressure differential.

While bodies having pores of 1.2 and 0.7 microns in diameter are suitable for pressure differentials considerably greater than for that for which bodies having pores of about 5.5 microns in diameter may be employed, it should be understood that the use of bodies having pores 1.2 and 0.7 microns in diameter provides passages unduly small for a pressure differential in a range in which a body having pores 5.5 microns in diameter is suitable, because for this pressure differential it is possible to use a porous body having pores which will be quite satisfactory and allow the fluid to be separated to pass therethrough at an optimum rate and considerably faster than when bodies having pores of 1.2 and 0.7 microns in diameter are employed.

Hence, for the particular pressure differential that is established across the bodies EA and EB, it is desirable to employ porous members having pores which will permit an optimum rate of flow of fluid therethrough by a pressure at the outer surfaces of the bodies which is safely below the "unblocking" pressure, so that the only fluid passing through each member will be fluid normally filling the pores of that member. Stated another way, each fluid to be separated is caused to pass through a porous body by a pressure differential across the wall thereof which is less than the predetermined value and of a magnitude which is correlated to the maximum sizes of the passages in the wall, so that an optimum rate of flow of the fluid will be effected through the wall without exceeding the difference in surface tensions of the fluid to be separated and the other fluid immiscible therewith.

In order that both porous bodies EA and FB will be utilized efficiently to effect separation of gasoline and water, the maximum sizes of the pores in the two bodies should be such that the fluid normally filling the pores of each body will be displaced by the other fluid at substantially the same "unblocking" pressure. However, it is to be understood that during normal operation the pressure at the outer surfaces of the bodies EA and EB will be somewhat less than the "unblocking" pressure, so that the fluid normally filling the pores of these bodies will not be displaced by the other fluid.

In operation the volumetric rate of inflow into the chamber $aa$ will be equal to the sum of the volumetric rates of outflow through the members EA and EB. On an increase or decrease in the amount of gasoline relative to the amount of water entering the chamber aa, the quantity of gasoline in the chamber aa will increase or decrease, and the quantity of water in the chamber will decrease or increase with a resultant change in the level FA. An increase or decrease in the height of that level decreases and increases the gasoline discharge capacity of the apparatus relative to its water discharge apparatus by varying the relative length of the portions of the member EA and EB below and above the level FA.

In view of the foregoing, it will now be understood that in practicing the invention to effect separation of a first fluid from a second fluid immiscible therewith, a porous wall member pervious to the first fluid is provided having capillary passages of such size that optimum flow of the first fluid is effected through the capillary passages for a preselected or known maximum delivery pressure at which the fluids are supplied.

When it is desired to separate one fluid, such as water, for example, from another fluid immiscible therewith, such as gasoline, for example, and a porcelain wall member like the member EA in Fig. 2 is provided to effect such separation, the water filling each capillary passage is in intimate contact with the wall of the passage and solid surface immediately surrounding its inlet or entrance opening.

There is an interfacial surface between such water and the gasoline which is prevented from touching the porous wall member because of the water wetting the latter. Any pressure, however slight, will tend to bulge the gasoline-water interface into the capillary entrance. The extent to which the gasoline-water interface bulges is opposed or resisted by a force at the interface of the two fluids which is dependent upon and developed by the difference in surface tensions of the fluids under equilibrium conditions and which is commonly referred to as "interfacial tension."

The resisting force which is developed by the interfacial tension at the entrance of each capillary passage is dependent upon the perimeter of the passage at the entrance thereto. A critical or "unblocking" pressure is reached when the pressure differential across the wall member increases to cause such bulging and distention of the interfacial surface at the points of yield at the capillary entrance that the interfacial surface becomes substantially parallel to the axis of the capillary passage, at which time the gasoline or fluid normally held back will begin to flow through the capillary passage.

It is possible to compute the limiting or critical pressure for a given fluid-fluid separation through a system of capillaries of known maximum area. The driving force is the product of the pressure differential across the wall member and the effective capillary cross sectional area, and the resisting force is the product of the interfacial tension of the fluids, such as gasoline and water, for example, and the peripheral locus of the capillary passage along which it acts. The peripheral locus or the length of the perimeter of the capillary passage at its entrance is in a plane virtually congruent with the capillary cross section at the points of yield of the interfacial bulge. The points of yield are at the perimeter of the capillary passage at the entrance thereto. The resulting formula, which is applicable to any system of capillaries, is $$A = \frac{Y\omega}{P}$$

in which P is the pressure differential across the porous wall member, A is the effective cross sectional area of the maximum size capillary passage, Y is the peripheral locus of such maximum size capillary passage at the points of yield at the interfacial bulge and ω (omega) is the difference in surface tensions of the fluids under equilibrium conditions.

Hence, for each aplication a porous wall member pervious to the fluid to be separated may be provided in which the maximum size capillary passage, having a cross sectional area A and peripheral locus Y, is related to the difference in the surface tensions ω of the immiscible fluids and pressure differential P produced across the wall member in accordance with the above formula, such pressure differential P being produced when the wall member is subjected by the fluids to a pressure at or approaching a preselected or known maximum pressure. When the porous wall member having capillary passages of a definite maximum size for a preselected or known supply pressure of the fluids is provided, the fluid to be separated will flow through the capillary passages while the other fluid immiscible therewith is prevented from flowing through the wall member by the difference in surface tensions of the two immiscible fluids at the inlets of the capillary passages. Further, the wall member will permit flow therethrough of the fluid to be separated and be impervious to and prevent flow of the other immiscible fluid so long as the pressure differential does not exceed a definite value and overcome the difference in surface tensions of the immiscible fluids.

In the specification and claims the expression "difference in surface tensions" of the immiscible fluids to be separated is to be interpreted as the arithmetical difference in surface tensions of the fluids under equilibrium conditions and which is commonly referred to as "interfacial tension" for the separation of one liquid from another liquid immiscible therewith; the "peripheral locus" is to be interpreted as the length of the perimeter of the capillary passage at the points of yield of the interfacial bulge when it distends into the capillary passage; and the term "water" is to be interpreted to include water solutions as well as water alone.

While in accordance with the provisions of the statutes I have illustrated and described several embodiments of the invention, it will be apparent to those skilled in the art that modifications and changes may be made from the forms of the invention disclosed without departing from the spirit and scope of my invention, as set forth in the following claims, and that in some cases certain features of my invention may be used to advantage without a corresponding use of other features.

Having now described my invention, what I claim as new and desire to secure by Letters Patent, is:

1. In the art of separating a first fluid at an optimum flow rate from a second fluid immiscible therewith and in which the difference in surface tensions of the fluids is ω, such separation being effected with the aid of a porous wall member which is formed with capillary passages and pervious to the first fluid, which comprises bringing a mixture of the fluids into physical contact with such a wall member, producing a pressure differential P across the wall member to cause flow of the first fluid through the capillary passages whose maximum size is of cross sectional area A having a peripheral locus Y, the maximum size capillary passage being related to the difference in surface tensions ω and pressure differential P in a manner substantially to satisfy the formula $$A = \frac{Y\omega}{P}$$

so that, while the first fluid is flowing through the capillary passages, the second fluid is prevented from flowing through the wall member by the difference in surface tensions ω of the first and second fluids at the inlets of the capillary passages.

2. In the art of separating a first fluid at an optimum flow rate from a second fluid immiscible therewith and in which the difference in surface tensions of the fluids is ω, such separation being effected with the aid of a porous wall member which is formed with capillary passages and pervious to the first fluid, which comprises bringing the first and second fluids into physical contact with such a wall member and subjecting the latter by the fluids to a pressure at or approaching a preselected maximum pressure to produce a pressure differential across the wall member and effect flow of the first fluid through the capillary passages, such wall member having a maximum size capillary passage whose cross sectional area A and peripheral locus Y is related to the difference in surface tensions ω and pressure differential P produced across the wall member, when the latter is subjected by the fluids to the pressure at or approaching the preselected maximum pressure, in a manner substantially to satisfy the formula $$A = \frac{Y\omega}{P}$$

so that, while the first fluid is flowing through the capillary passages, the second fluid is prevented from flowing through said wall member by the difference in surface tensions ω of the first and second fluids at the inlets of the capillary passages, the wall member permitting flow of the first fluid therethrough and being impervious to and preventing flow of the second fluid so long as the pressure differential does not exceed P and overcome the difference in surface tensions ω of the first and second fluids.

3. Apparatus for separating immiscible fluids including a first fluid and water immiscible therewith, such apparatus comprising wall means forming a chamber having an inlet for the fluids, said wall means including a hydrophobic wall member which is pervious to the first fluid and formed with capillary passages, means to supply the fluids to the chamber at the inlet and cause the fluids in physical contact with the wall member to subject the latter to a pressure at or approaching a preselected maximum pressure to produce a pressure differential across the wall member and effect flow of the first fluid from the chamber through the capillary passages, means communicating with the discharge side of the hydrophobic wall member for discharging the first fluid from the apparatus, means for withdrawing from the chamber water held back by the hydrophobic wall member, the porous wall member being formed and constructed to effect optimum flow of the first fluid through the capillary passages thereof so as to substantially satisfy the formula $$A = \frac{Y\omega}{P}$$

in which P is the pressure differential produced across the wall member when the latter is subjected by the fluids to the pressure at or approaching the preselected maximum pressure; A is the cross sectional area of the maximum size capillary passage in the wall member; Y is the peripheral locus of the maximum size capillary passage in the wall member; and ω is the difference in surface tensions between the first fluid and water.

4. Apparatus as defined in claim 3 in which the means for withdrawing water from the chamber comprises a porous hydrophilic wall member having capillary passages and forming part of the wall means for the chamber, said hydrophilic wall member being pervious to and permitting passage of water therethrough, and, upon once being wetted with water, being impervious to and preventing passage of the first fluid therethrough.

5. Apparatus for separating immiscible fluids including water and a second fluid immiscible therewith, such apparatus comprising wall means forming a chamber having an inlet for the fluids, said wall means including a porous hydrophilic wall member formed with capillary passages, said wall member being pervious to and permitting flow of water therethrough, and, upon once being wetted with water, being impervious to and preventing passage of the second fluid therethrough, means to supply the fluids to the chamber at the inlet and cause the fluids in physical contact with the wall member to subject the latter to a pressure at or approaching a preselected maximum pressure to produce a pressure differential across the wall member and effect flow of water through the capillary passages, means communicating with the discharge side of the hydrophilic wall member for discharging water from the apparatus, means for withdrawing from the chamber the second fluid held back by the hydrophilic wall member, the porous wall member being formed and constructed to effect optimum flow of water through the capillary passages thereof so as to substantially satisfy the formula $$A = \frac{Y\omega}{P}$$

in which P is the pressure differential produced across the wall member when the latter is subjected by the fluids to the pressure at or approaching the preselected maximum pressure; A is the cross sectional area of the maximum size capillary passage in the wall member; Y is the peripheral locus of the maximum size capillary passage in the wall member; and ω is the difference in surface tensions of water and the second fluid.

6. Apparatus as defined in claim 5 in which the means for withdrawing the second fluid from the chamber comprises a porous hydrophobic wall member having capillary passages and forming part of the wall means for the chamber, said hydrophobic wall member being pervious to and permitting passage of the second fluid therethrough and impervious to and preventing passage of water therethrough.

JOHN M. WALKER, Jr.

Certificate of Correction

Patent No. 2,404,872.  July 30, 1946.

JOHN M. WALKER, JR.

It is hereby certified that errors appear in the printed specification of the above numbered patent requiring correction as follows: Column 3, line 34, after "as" insert *the surface tension between the water filling the capillary passages and the air is not exceeded or ruptured.*; column 8, line 60, for "FB" read *EB*; and column 10, line 9, for "aplication" read *application*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*